United States Patent
Shen

(10) Patent No.: US 8,861,365 B2
(45) Date of Patent: Oct. 14, 2014

(54) METHOD FOR INCREASING WIRELESS NETWORKING SPEED, AND A WIRELESS NETWORK APPARATUS

(75) Inventor: Sheng-Kun Shen, Hsinchu County (TW)

(73) Assignee: Wistron NeWeb Corp., Hsinchu County (TW)

( * ) Notice: Subject to any disclaimer, the term of this patent is extended or adjusted under 35 U.S.C. 154(b) by 106 days.

(21) Appl. No.: 13/603,860

(22) Filed: Sep. 5, 2012

(65) Prior Publication Data

US 2013/0070601 A1  Mar. 21, 2013

(30) Foreign Application Priority Data

Sep. 15, 2011 (TW) .............. 100133187 A

(51) Int. Cl.
*H04W 28/08* (2009.01)
*H04W 76/02* (2009.01)
*H04W 48/20* (2009.01)

(52) U.S. Cl.
CPC .............. *H04W 28/08* (2013.01); *H04W 48/20* (2013.01); *H04W 76/025* (2013.01)
USPC ........... 370/236; 370/255; 370/331; 370/338; 455/438; 455/561; 455/512

(58) Field of Classification Search
CPC ......... H04L 47/10; H04L 45/02; H04L 41/12; H04Q 11/0478; H04W 28/08; H04W 48/20
USPC .......... 370/236, 255, 331, 338; 455/438, 561, 455/512
See application file for complete search history.

(56) References Cited

U.S. PATENT DOCUMENTS

| | | | |
|---|---|---|---|
| 7,653,038 B2 | 1/2010 | Chung et al. | |
| 7,864,732 B2 | 1/2011 | Lo et al. | |
| 2007/0177549 A1* | 8/2007 | Lo et al. | ......................... 370/331 |
| 2010/0306358 A1* | 12/2010 | Droux et al. | .................. 709/223 |

\* cited by examiner

*Primary Examiner* — Jamal Javaid
(74) *Attorney, Agent, or Firm* — Dickstein Shapiro LLP

(57) ABSTRACT

A method for increasing wireless networking speed is for use between an electronic device equipped with a wireless networking device and a wireless network having a group of wireless network base stations. The method includes the steps of: (A) providing the wireless network apparatus with two medium access control (MAC) addresses so as to simulate two wireless network cards; (B) selecting, from among the group of wireless network base stations, two wireless network base stations respectively for the wireless network cards; and (C) making the electronic device simultaneously communicate with the two wireless network base stations using the wireless network cards.

8 Claims, 6 Drawing Sheets

METHOD FOR INCREASING WIRELESS NETWORKING SPEED, AND A WIRELESS NETWORK APPARATUS

CROSS-REFERENCE TO RELATED APPLICATION

This application claims priority of Taiwanese Application No. 100133187, filed on Sep. 15, 2011 and incorporated herein by reference.

BACKGROUND OF THE INVENTION

1. Field of the Invention

The invention relates to a networking apparatus, more particularly to a wireless network apparatus for communicating with wireless network base stations.

2. Description of the Related Art

The Multi-Input Multi-Output (MIMO) technology can utilize multiple antennas at the transmitting end to transmit signals individually, and can utilize multiple antennas at the receiving end to receive signals, in order to enhance the signal transmission efficiency in wireless communication, and is often adopted in wireless communication devices.

In an environment supporting wireless networking, one will find that some electronic devices operate at high networking speeds, while others operate at low networking speeds. The reason for the low networking speeds often stems from overloading at the wireless network base stations or access points. However, automatic switching to another wireless network base station with less loading is not supported by conventional electronic devices, and users have to perform the switching manually.

In U.S. Pat. No. 7,653,038, there is disclosed a wireless network apparatus including two medium access controllers (MACs) to allow for communication with the Internet respectively through first and second sub-networks, each including a plurality of wireless stations. However, regardless of whether the communication is performed through the wireless station of the first or the second sub-networks, the same communication channel is used for communication between the wireless station and the corresponding medium access controller.

In U.S. Pat. No. 7,864,732, there is disclosed a wireless network apparatus having two medium access control (MAC) addresses, each of which is associated with a wireless network base station, to enable switching between two wireless network base stations. In other words, the wireless network apparatus can only choose one wireless network base station at a time.

In view of the above, it would be beneficial to provide a wireless networking device that can increase the wireless networking speed by simultaneously communication with two wireless base stations, with a concept similar to the MIMO technology.

SUMMARY OF THE INVENTION

Therefore, the object of the present invention is to provide a method for increasing wireless networking speed and a wireless network apparatus implementing the method.

According to one aspect of the present invention, there is provided a method for increasing wireless networking speed for use between an electronic device equipped with a wireless networking device and a wireless network having a group of wireless network base stations. The method includes the steps of: (A) providing the wireless network apparatus with two medium access control (MAC) addresses so as to simulate two wireless network cards; (B) selecting, from among the group of wireless network base stations, two wireless network base stations respectively for the wireless network cards; and (C) making the electronic device simultaneously communicate with the two wireless network base stations using the wireless network cards.

Preferably, step (B) includes the sub-steps of: (B1) searching the wireless network for the group of wireless network base stations; (B2) selecting, from among the group of wireless network base stations searched in sub-step (B1), one wireless network base station which is not recorded in a history list, which has a strongest signal strength, and which is not connected to any of said wireless network cards, the history list being used for recording those wireless network base stations that have been unsuccessful in establishing connection with one of the wireless network cards in the past; (B3) attempting to establish connection between the wireless network base station selected in sub-step (B2) and one of the wireless network cards which is not connected with any wireless network base station; (B4) recording the wireless network base station selected in sub-step (B2) in the history list and returning to sub-step (B2) if it is determined that the attempt to establish the connection is unsuccessful in sub-step (B3); (B5) returning to sub-step (B2) if it is determined that the attempt to establish the connection is successful in sub-step (B3) and that one of the wireless network cards has not established connection with any of the wireless network base stations within the group; and (B6) proceeding to step (C) if it is determined that the attempt to establish the connection is successful in sub-step (B3) and that each of the wireless network cards is connected to one of the wireless network base stations within the group.

Preferably, in sub-step (B2), if all of the wireless network base stations in the group are recorded in the history list, one wireless network base station which has been recorded in the history list the longest is selected.

Preferably, step (C) includes the sub-steps of: (C1) assigning a communication loading of 50% to each of the two wireless network base stations selected in step (B); (C2) making the electronic device communicate with each of the two wireless network base stations selected in step (B) using a corresponding one of the wireless network cards with the communication loading assigned to the wireless network base station; (C3) recording an actual communication loading and a response time for each of the two wireless network base stations; (C4) adjusting the assigned communication loading for each of the two wireless network base stations and returning to sub-step (C2) if it is determined with reference to the actual communication loadings and the response times recorded in sub-step (C3) for the two wireless network base stations that it is necessary to adjust the assigned communication loadings for the two wireless network base stations and that the actual communication loading for each of the two wireless network base stations is not smaller than a predetermined loading threshold; (C5) returning to sub-step (C3) if it is determined that it is unnecessary to adjust the assigned communication loadings; (C6) determining whether a signal strength of said one of the two wireless network base stations is greater than a predetermined signal strength threshold if it is determined that the actual communication loading recorded in sub-step (C3) for one of the two wireless network base stations is smaller than the predetermined loading threshold; (C7) recording said one of the two wireless network base stations in both a priority list and the history list if it is determined that the signal strength is greater than the predetermined signal strength threshold in sub-step (C6);

(C8) recording said one of the two wireless network base stations in the history list if it is determined that the signal strength is not greater than the predetermined signal strength threshold in sub-step (C6); and (C9) making the electronic device stop communicating with said one of the two wireless network base stations using the corresponding one of the wireless network cards and returning to step (B) to select, from among the group of wireless network base stations, another wireless network base station in place of said one of the two wireless network base stations for the corresponding one of the wireless network cards.

Preferably, in step (B), if all of the wireless network base stations in the group are recorded in one of the priority list and the history list, one wireless network base station which has been recorded in the priority list the longest is selected, and if no wireless network base stations is recorded in the priority list, one wireless network base stations which has been recorded in the history list the longest is selected.

According to another aspect of the present invention, there is provided a wireless network apparatus to be provided on an electronic device for enabling the electronic device to communicate wirelessly and simultaneously with two wireless network base stations. The wireless network apparatus includes two wireless network transceiving modules, a memory, a driver and a processor. The wireless network transceiving modules are each capable of communicating with a corresponding wireless network base station. The memory is recorded with two medium access control (MAC) addresses. The driver is used for simulating two wireless network cards respectively based on the MAC addressees. The processor is coupled electrically to the memory, is capable of converting wireless network signals that are received from the wireless network transceiving modules via the wireless network cards into digital signals acceptable by the electronic device, and is further capable of converting digital signals that originate from the electronic device into wireless network signals for subsequent transmission to the wireless network transceiving modules via the wireless network cards.

The processor is loaded with a first application program, which when executed, causes the processor to search a wireless network for a group of wireless network base stations, and to select, from among the group of wireless network base stations thus searched, two wireless network base stations to respectively associate with the wireless network cards, and a second application program, which when executed, causes the processor to simultaneously communicate with the wireless network base stations using the wireless network cards.

Preferably, the first application program causes the processor to select, from among the group of wireless network base stations searched thereby, for each of the wireless network cards, a wireless network base station which is not recorded in a history list and which has a strongest signal strength, to attempt to establish connection between the wireless network card and the wireless network base station thus selected, and to determine whether the attempt to establish the connection is successful. The history list is used for recording those wireless network base stations that have been unsuccessful in establishing connection with one of the wireless network cards in the past.

The second application program is executed by the processor if it is determined that the attempt is successful for both of the wireless network cards.

The first application program causes the processor to record the wireless network base station thus selected in the history list if it is determined that the attempt has failed, and re-select, from among the group of wireless network base stations searched thereby, a wireless network base station with the strongest signal strength and not recorded in the history list for the corresponding one of the wireless network cards.

Preferably, if all of the wireless network base stations in the group of wireless network base stations are recorded in the history list, two wireless network base stations which have been recorded in the history list the longest are selected for the wireless network cards.

Preferably, the processor is caused by the second application program to assign a communication loading of 50% to each of the two wireless network base stations selected thereby, to make the electronic device communicate with each of the two wireless network base stations using a corresponding one of the wireless network cards with the communication loading assigned to the wireless network base station, to record an actual communication loading and a response time for each of the two wireless network base stations, to adjust the assigned communication loading for each of the two wireless network base stations if it is determined with reference to the actual communication loadings and the response times thus recorded for the two wireless network base stations that it is necessary to adjust the assigned communication loadings for the two wireless network base stations, and that the actual communication loading for each of the two wireless network base stations is not smaller than a predetermined loading threshold, to determine, upon determining that the actual communication loading for one of the two wireless network base stations is smaller than the predetermined loading threshold, whether a signal strength of said one of the two wireless network base stations is greater than a predetermined signal strength threshold, to record said one of the wireless network base stations in both a priority list and the history list if it is determined that the signal strength is greater than the predetermined signal strength threshold, to record said one of the two wireless network base stations in the history list if it is determined that the signal strength is not greater than the predetermined signal strength threshold, and to make the electronic device stop communicating with said one of the two wireless network base stations using the corresponding one of the wireless network cards and re-execute the first application program so as for the processor to select, from among the group of wireless network base stations, another wireless network base station in place of said one of the two wireless network base stations for the corresponding one of the wireless network cards.

Preferably, if all of the wireless network base stations in the group are recorded in one of the priority list and the history list, one wireless network base station which has been recorded in the priority list the longest is selected by the processor, and if no wireless network base stations is recorded in the priority list, one wireless network base stations which has been recorded in the history list the longest is selected by the processor.

Preferably, the driver is to be installed in the electronic device for execution thereby.

According to still another aspect of the present invention, there is provided a computer program product, which when executed by an electronic device, causes the electronic device to perform the aforesaid method.

The advantages and effects of the present invention reside in that by providing two medium access control (MAC) addresses in the wireless network apparatus to be used for simulation of two wireless network cards, by providing two wireless network transceiving modules to communicate with wireless network base stations simultaneously, and by automatically selecting two wireless network base stations with the strongest signal strength and monitoring the communication loading of the wireless network base stations, the present invention not only solves the problem of the user having to manually switch to a different wireless network base station, but also promotes the wireless network communication speed of the electronic device.

BRIEF DESCRIPTION OF THE DRAWINGS

Other features and advantages of the present invention will become apparent in the following detailed description of the embodiment with reference to the accompanying drawings, of which.

DETAILED DESCRIPTION OF THE EMBODIMENT

Figure 1:
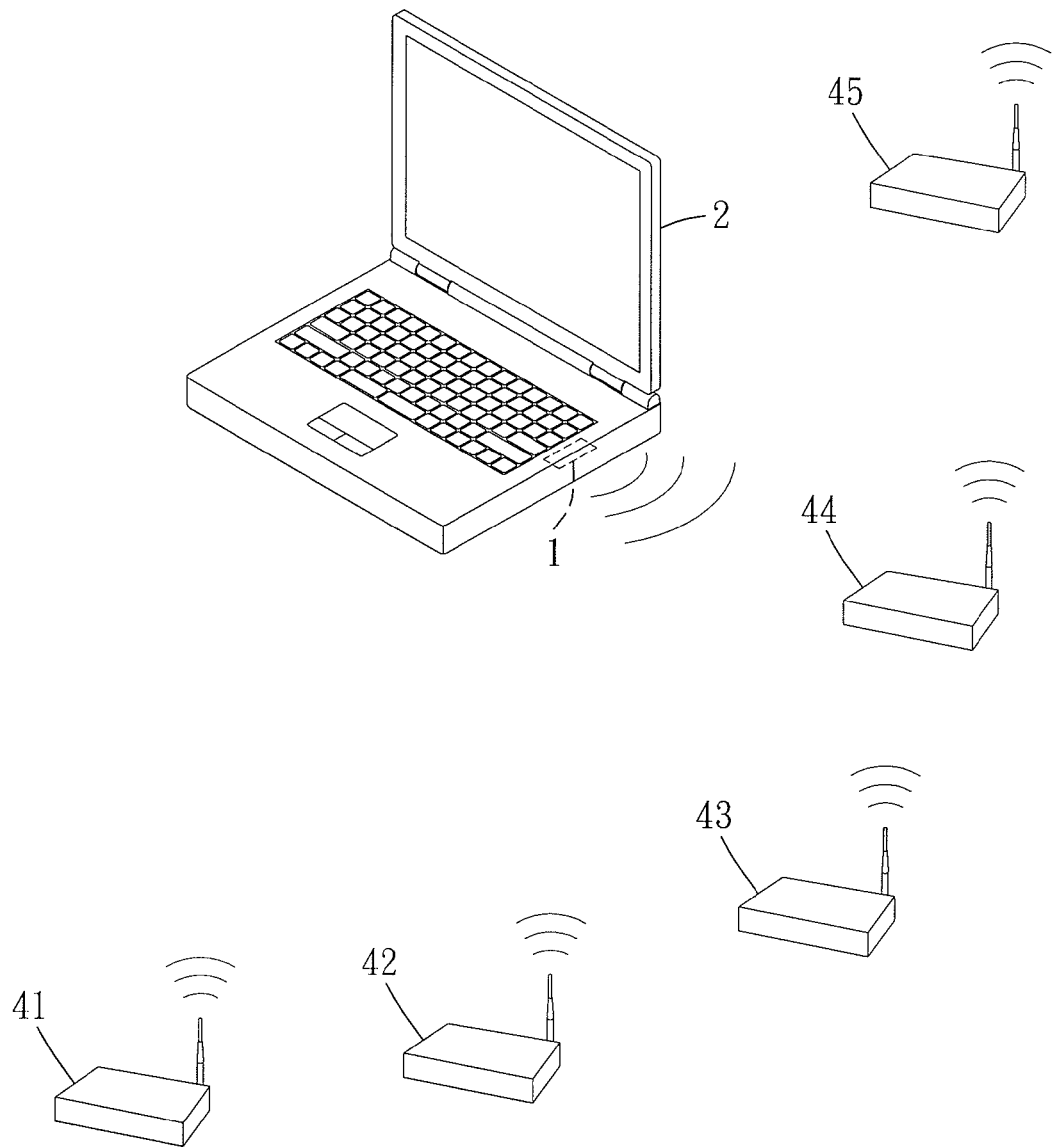
FIG. 1 is a schematic diagram illustrating a wireless network apparatus according to one embodiment of the present invention being provided in an electronic device so that the electronic device is enabled to communicate wireless with two of a plurality of wireless network base stations.

Before the present invention is described in greater detail, it should be noted that like elements are denoted by the same reference numerals throughout the disclosure.

With reference to FIG. 1, the wireless network apparatus 1 according to one embodiment of the present invention may be provided within an electronic device 2 (e.g., a notebook computer) or provided on the electronic device 2 through an external connection for enabling the electronic device 2 to communicate wirelessly and simultaneously with two wireless network base stations of a group of a plurality of wireless network base stations, for example, the group of five wireless network base stations 41~45. It should be noted herein that the number of wireless network base stations of the group is not to be limited.

Figure 2:
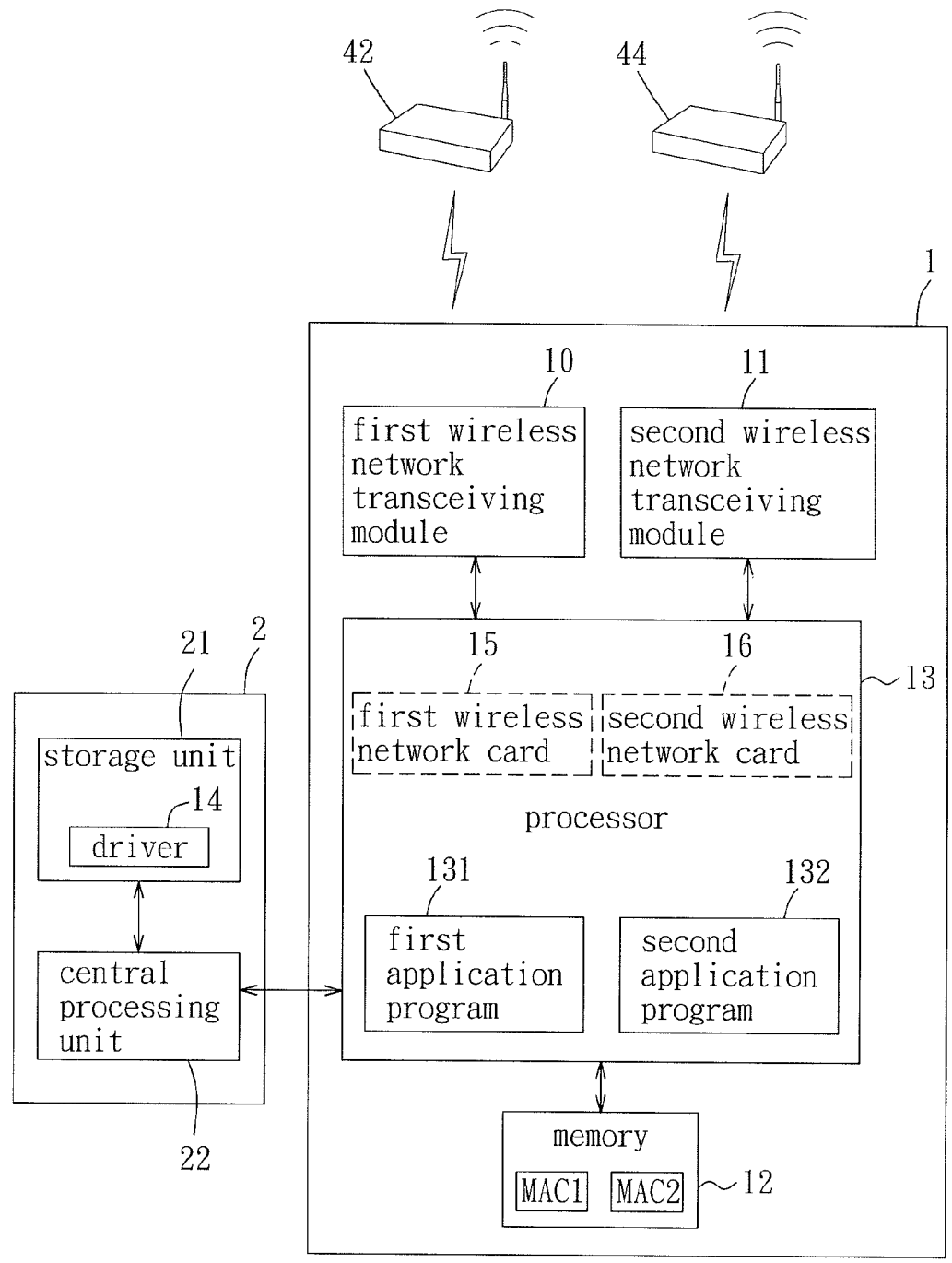
FIG. 2 is a block diagram illustrating components of the wireless network apparatus and the electronic device.

With reference to FIG. 2, the wireless network apparatus 1 of this embodiment includes two wireless network transceiving modules, namely a first wireless network transceiving module 10 and a second wireless network transceiving module 11, a memory 12, a processor 13, and a driver 14.

The first and second wireless network transceiving modules 10, 11 are identical, and are each capable of communicating with a corresponding wireless network base station. Taking the wireless network base stations 42, 44 from the group for illustration, the first and second wireless network transceiving modules 10, 11 can receive/transmit wireless network signals from/to the wireless network base stations 42, 44, respectively. Herein, each of the first and second wireless network transceiving modules 10, 11 at least includes an antenna module, a radio frequency module, and a baseband frequency module, etc. The radio frequency module is in charge of frequency synthesis, data conversion and noise filtering. The baseband frequency module is in charge of message encoding, encryption and decryption, and frequency hopping and packing processes. The antenna module is used for signal transmission and reception, and can adopt the conventional MIMO scheme to enhance efficiency.

Figure 3:
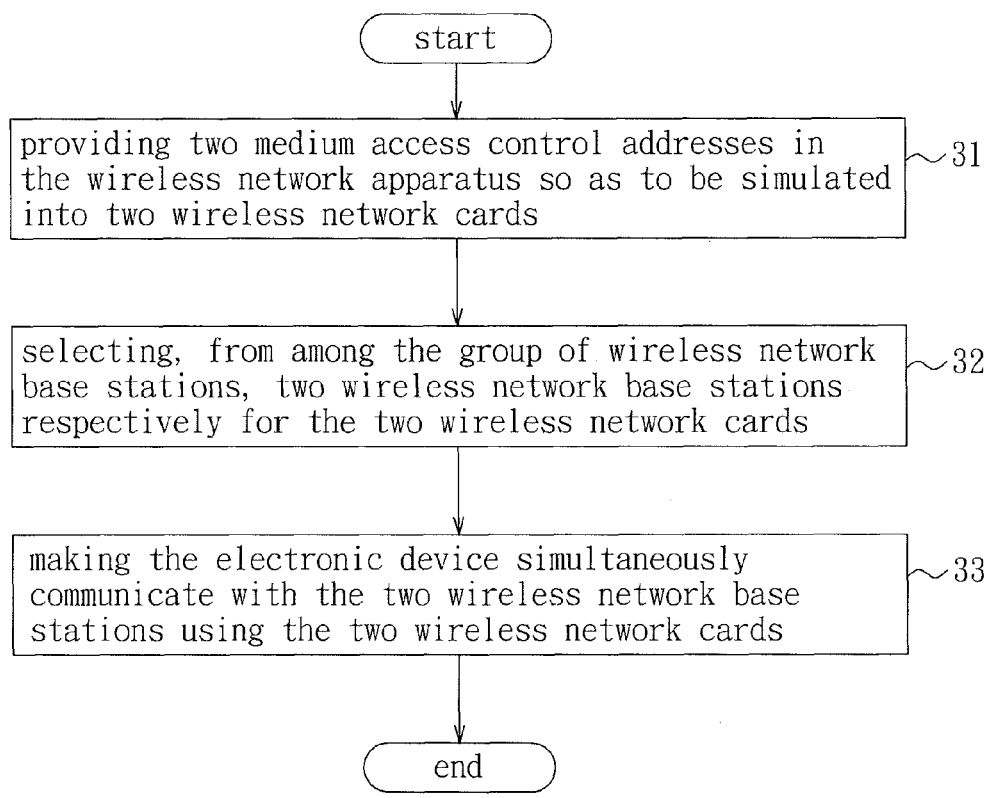
FIG. 3 is a flowchart of the method for increasing wireless networking speed according to the embodiment of the present invention.

The method for increasing wireless networking speed according to the embodiment of the present invention is shown in FIG. 3. First, in step 31, two medium access control (MAC) addresses MAC1, MAC2 are provided in the wireless network apparatus 1 so as to be used for simulation of two wireless network cards. More specifically, in this embodiment, the memory 12 of the wireless network apparatus 1 is recorded with two medium access control addresses MAC1, MAC2, the memory 12 is an erasable programmable read only memory (EPROM) for illustration purposes. The driver 14 is pre-installed and stored in a storage unit 21 of the electronic device 2. When the driver 14 is executed by a central processing unit 22 of the electronic device 2, the central processing unit 22 will access the memory 12 and the driver 14 will simulate two wireless network cards, namely a first wireless network card 15 and a second wireless network card 16, respectively based on the medium access control addressees MAC1, MAC2, such that the electronic device 2 may access the first and second wireless network cards 15, 16 with different medium access control addresses MAC1, MAC2.

The first and second wireless network cards 15, 16 are respectively associated with the first and second wireless network transceiving modules 10, 11. In other words, the first wireless network card 15 communicates with the wireless network base station 42 via the first wireless network transceiving module 10, and the second wireless network card 16 communicates with the wireless network base station 45 via the second wireless network transceiving module 11. Since providing two medium control access addresses in a wireless network apparatus is known in the art, e.g., U.S. Pat. No. 7,864,732, details of the same are omitted herein for the sake of brevity.

The processor 13 is electrically coupled to the memory 12, and to the first and second wireless network transceiving modules 10, 11. The processor 13 receives wireless network signals from the first and second wireless network transceiving modules 10, 11 via the respective first and second wireless network cards 15, 16, and is capable of converting the wireless network signals thus received into digital signals that are acceptable by the electronic device 2. The processor 13 is further capable of converting digital signals that originate from the electronic device 2 into wireless network signals for subsequent transmission to the first and second wireless network transceiving modules 10, 11 via the first and second wireless network cards 15, 16. Moreover, the processor 13 is loaded with a first application program 131 and a second application program 132. When it is desired for the electronic device 2 to communicate using the wireless network apparatus 1, in step 32 shown in FIG. 3, the processor 13 will select, from among the group of wireless network base stations 41~45, two wireless network base stations respectively for the first and second wireless network cards 15, 16. Specifically, the processor 13 executes the first application program 131 so as to be caused to first search a wireless network for a group of wireless network base stations, e.g., the group consisting of wireless network base stations 41~45, and then to select, from among the group, two wireless network base stations. (e.g., 42, 44) respectively for the first and second wireless network cards 15, 16.

Figure 4:
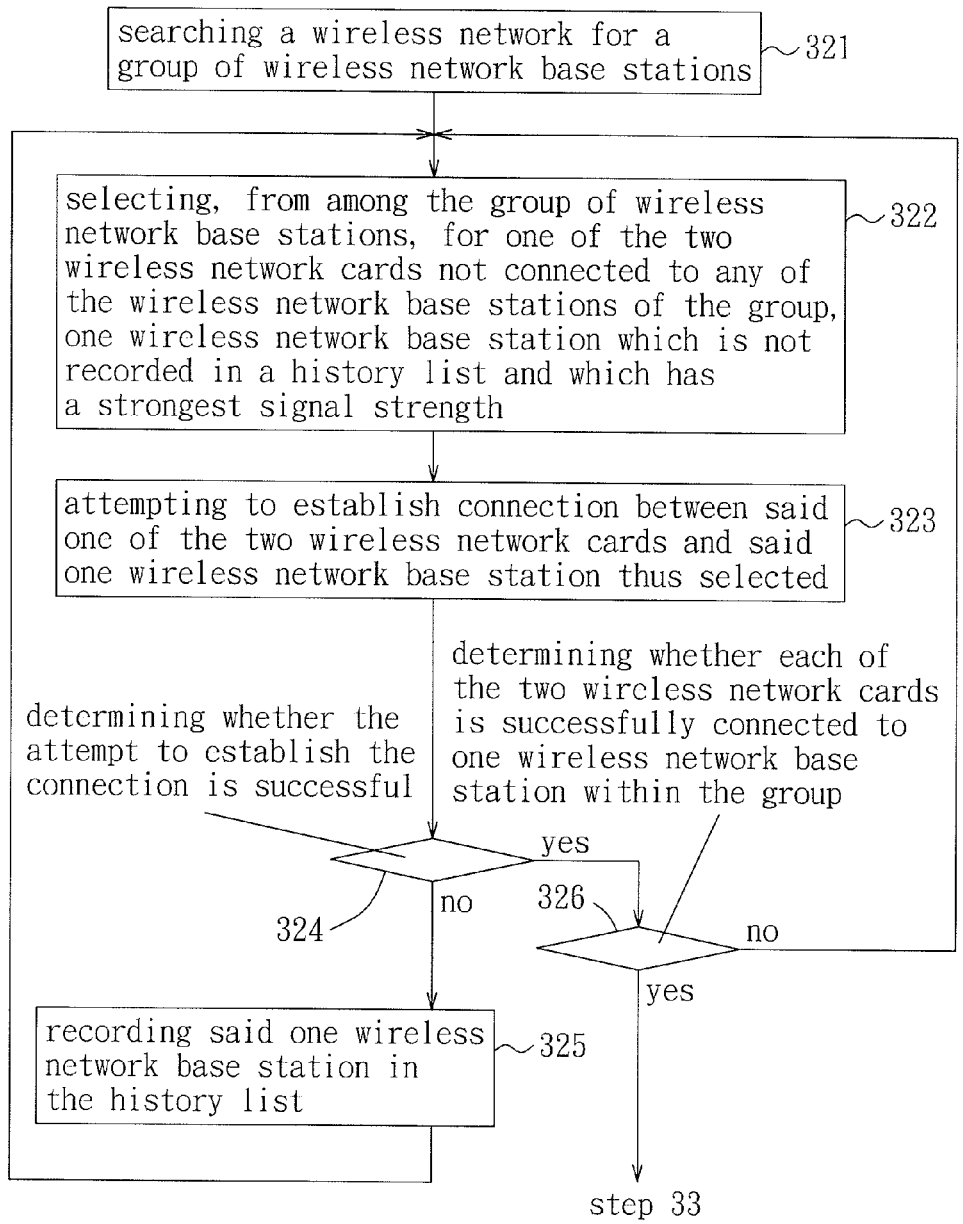
FIG. 4 is a flowchart illustrating sub-steps of a step 32 of the method shown in FIG. 3.

In detail, with further reference to FIG. 4, the first application program 131 causes the processor 13 to, as in sub-step 321, search the wireless network for the group of wireless network base stations 41~45. Next, in sub-step 322, the first application program 131 causes the processor 13 to detect a signal strength of each wireless network base station 41~45 in the group searched thereby, to check whether one wireless network base station with the strongest signal strength from among the group of wireless network base stations 41~45 (e.g., the wireless network base station 41) is recorded in a history list, and to select said one wireless network base station 41 for one of the first and second wireless network cards 15, 16 which is not connected to any of the wireless network base stations 41~45 of the group (e.g., the first wireless network card 15), i.e., to set said one wireless network base station 41 as the destination for packet transmission of the first wireless network card 15. The history list is used for recording those wireless network base stations that have been unsuccessful in establishing connection with one of the first and second wireless network cards 15, 16 in the past. Subsequently, in sub-step 323, the first application program 131 causes the processor 13 to attempt to establish connection between the first wireless network card 15 and said one wireless network base station 41 thus selected, i.e., for the first wireless network card 15 and said one wireless network base station 41 to perform mutual authentication and association, and in sub-step 324, to determine whether the attempt to establish the connection is successful.

In the negative, i.e., if it is determined that the attempt to establish the connection has failed in sub-step 323, the process goes to sub-step 325, where the processor 13 is caused to record said one wireless network base station 41 in the history list, and the process returns to sub-step 322 to re-select, from among the group of wireless network base stations searched thereby, another wireless network base station not recorded in the history list and having the strongest signal strength for the corresponding one of the first and second wireless network cards 15, 16 (e.g., the first wireless network card 15).

If it is determined in sub-step 324 that the attempt to establish the connection is successful in sub-step 323, the process goes to sub-step 326, where the processor 13 is caused to determine whether each of the first and second wireless network cards 15, 16 is successfully connected to one wireless network base station within the group. In the negative, the process returns to sub-step 322, in order to select a wireless network base station for the wireless network card that is not yet connected to any wireless network base station within the group, i.e., the second wireless network card 16 in this example. If affirmative, i.e., if it is determined that each of the first and second wireless network cards 15, 16 is connected to one wireless network base station within the group, the process proceeds to step 33 (shown in FIG. 3), where the processor 13 makes the electronic device 2 simultaneously communicate with the wireless network base stations 42, 44 using the first and second wireless network cards 15, 16.

It is noted that if it is found in sub-step 322 that all of the wireless network base stations 41~45 in the group are recorded in the history list, two wireless network base stations which have been recorded in the history list the longest are selected for the first and second wireless network cards 15, 16. Alternatively, it can be done such that if any wireless network base station has been recorded in the history list for a predetermined period of time, the wireless network base station is erased from the history list.

After the processor 13 has found two wireless network base stations (e.g., the wireless network base stations 42, 44) respectively for the first and second wireless network cards 15, 16 with the use of the first application program 131, process proceeds to step 33. Specifically, the processor 13 executes the second application program 132, which causes the processor 13 to simultaneously communicate with the wireless network base stations 42, 44 using the first and second wireless network cards 15, 16. In other words, the second application program 132 is executed by the processor 13 if it is determined that the attempt is successful for both of the first and second wireless network cards 15, 16.

Figure 5A:
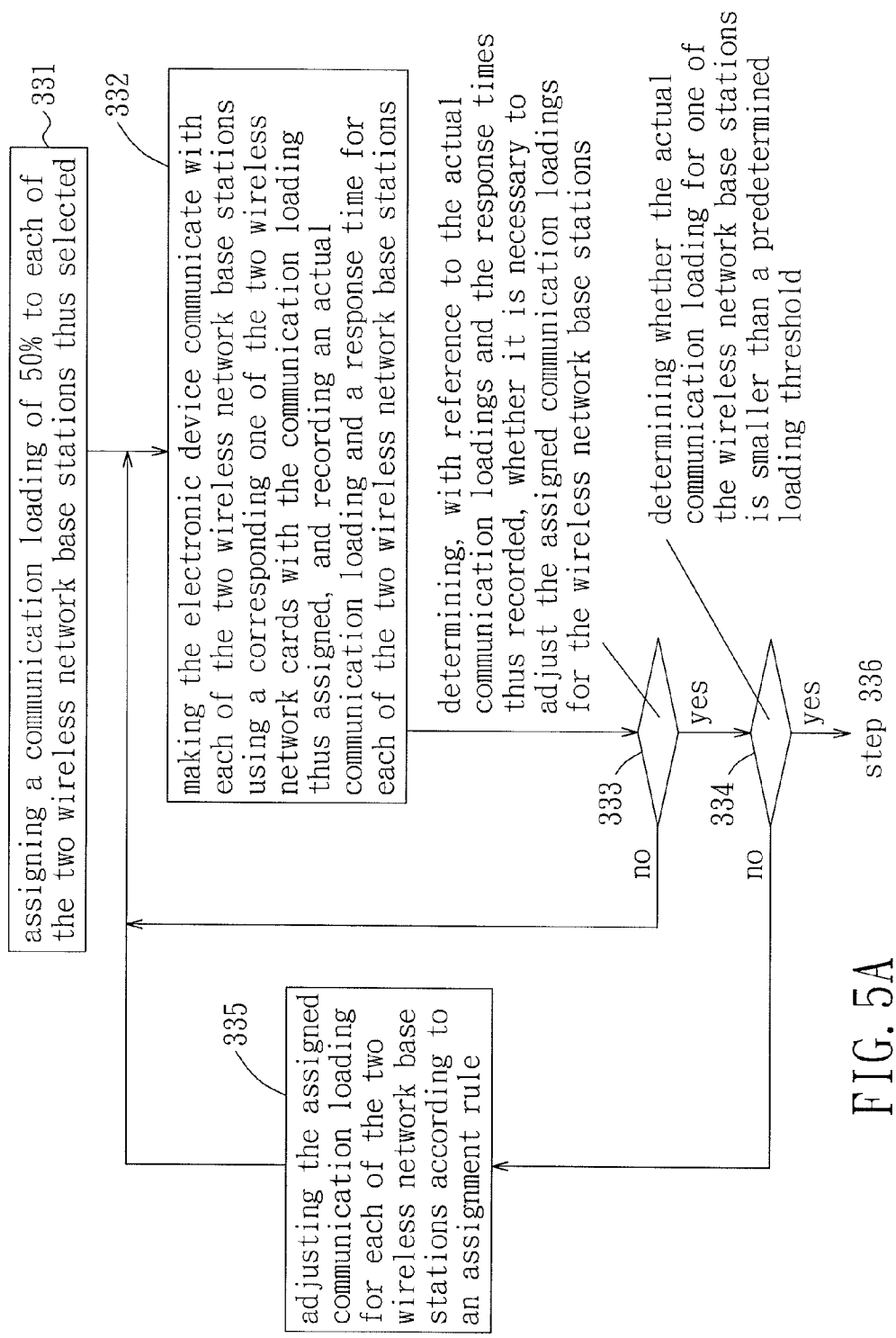
FIGS. 5A and 5B cooperative to form a flowchart illustrating sub-steps of a step 33 of the method shown in FIG. 3.
Figure 5B:
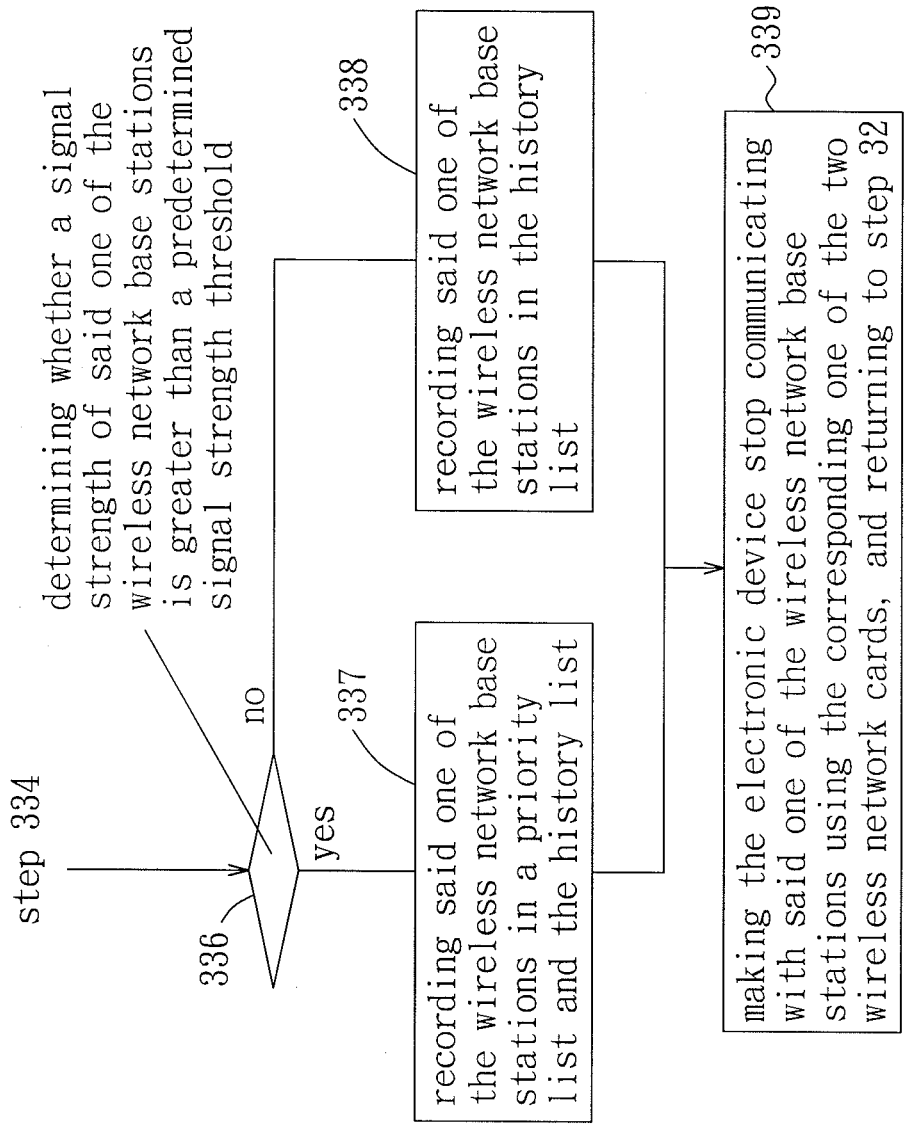

Specifically, with reference to FIG. 2 and FIGS. 5A and 5B, in sub-step 331, the processor 13 is caused by the second application program 132 to assign a communication loading of 50% to each of the wireless network base stations selected thereby (e.g., the wireless network base stations 42, 44). Next, in sub-step 332, the processor 13 is caused by the second application program 132 to make the electronic device 2 communicate with each of the wireless network base stations 42, 44 using a corresponding one of the first and second wireless network cards 15, 16 with the communication loading assigned to the wireless network base station 42, 44, and to record an actual communication loading and a response time for each of the wireless network base stations 42, 44. Then, in sub-step 333, the processor 13 is caused by the second application program 132 to determine with reference to the actual communication loadings and the response times recorded in sub-step 332 whether it is necessary to adjust the assigned communication loadings for the wireless network base stations 42, 44. For example, if the number of users connecting with the wireless network base station 42 is large, and it is determined that the actual communication loading for the wireless network base station 42 is 30%, then it is determined by the processor that it is necessary to adjust the assigned communication loadings. Alternatively, if the response times obtained for the wireless network base stations 42, 44 have a difference of within, e.g., 10%, i.e., if the response time obtained for one of the wireless network base stations 42, 44 divided by the response time obtained for the other of the wireless network base stations 42, 44 is between e.g., 0.95 and 1.05, then it is determined by the processor 13 that it is not necessary to adjust the assigned communication loadings. If it is determined in sub-step 333 that it is unnecessary to adjust the assigned communication loadings, the process returns to sub-step 332 to continue monitoring the actual communication loading the response time for the wireless network base stations 42, 44. On the other hand, if it is determined in sub-step 333 that it is necessary to adjust the assigned communication loadings, the process proceeds to sub-step 334, where the processor 13 is caused by the second application program 132 to determine whether the actual communication loading for one of the wireless network base stations 42, 44 is smaller than a predetermined loading threshold, e.g., 10%. Preferably, the processor 13 makes the determination of sub-step 334 only for the wireless network base station, whose assigned communication loading is the smaller between the assigned communication loadings for the wireless network base stations 42, 44. In the negative, i.e., if it is determined in sub-step 334 that the actual communication loading for each of the two wireless network base stations 42, 44 is not smaller than the predetermined loading threshold, the process goes to sub-step 335, where the processor 13 is caused by the second application program 132 to adjust the assigned communication loading for each of the two wireless network base stations 42, 44 according to an assignment rule, and the process returns to sub-step 332. The adjustment rule may be summarized in the following Table 1. For example, the assigned communication loading for the wireless network base station 42 is adjusted to 30%, while the assigned communication loading for the wireless network base station 44 is adjusted to 70%.

TABLE 1

| | Communication loading assignment percentage (%) | | | | | | | | |
|---|---|---|---|---|---|---|---|---|---|
| wireless network base station no. 1 | 10 | 20 | 30 | 40 | 50 | 60 | 70 | 80 | 90 |
| wireless network base station no. 2 | 90 | 80 | 70 | 60 | 50 | 40 | 30 | 20 | 10 |

In the affirmative, i.e., if it is determined in sub-step 334 that the actual communication loading for one of the two wireless network base stations 42, 44 is smaller than the predetermined loading threshold, the process goes to sub-step 336, where the processor 13 is caused by the second application program 132 to determine whether a signal strength of said one of the wireless network base stations 42, 44 is greater than a predetermined signal strength threshold. If affirmative, the process goes to sub-step 337, where the processor 13 is caused by the second application program 132 to record said one of the wireless network base stations 42, 44 in a priority list and the history list. In the negative, the process goes to sub-step 338, where the processor 13 is caused to record said one of the wireless network base stations 42, 44 in the history list. Subsequently, in sub-step 339, the processor 13 is caused by the second application program 132 to make the electronic device 2 stop communicating with said one of the wireless network base stations 42, 44 using the corresponding one of the first and second wireless network cards 15, 16, and return to step 32 to re-execute the first application program 131 so as for the processor 13 to select, from among the group of wireless network base stations 41~45, another wireless network base station in place of said one of the wireless network base stations 42, 44 for the corresponding one of the first and second wireless network cards 15, 16.

It should be noted herein that if all of the wireless network base stations 41~45 in the group are recorded in one of the priority list and the history list, one wireless network base station which has been recorded in the priority list the longest is selected by the processor 13 in step 32, and if no wireless network base stations is recorded in the priority list, one wireless network base stations which has been recorded in the history list the longest is selected by the processor 13 in step 32. Alternatively, it can be such that if a wireless network base station has been recorded in the priority list or the history list for a predetermined period of time, the record of the same is erased. Preferably, the predetermined period of time associated with the priority list should be shorter than the predetermined period of time associated with the history list.

It should be further noted herein that if the electronic device 2 supports both the $3^{rd}$ generation of mobile telecommunications technology (3G) and Wi-Fi, the present invention may be adopted to allow for simultaneous communication between a 3G network card of the electronic device 2 and a telecommunication network and between a Wi-Fi network card of the electronic device 2 and a wireless network with each network card choosing an optimal base station or access point for the communication. For example, a base station closest to the 3G network card may be selected for communication with the 3G network card, and a wireless network base station with the strongest signal may be selected for communication with the Wi-Fi network card, thereby increasing the wireless communication speed.

A computer program product, comprising a computer readable storage medium that includes program instructions, which when executed by an electronic device, cause the electronic device to perform the aforesaid method is also provided by the present invention.

In summary, the present invention provides two medium access control (MAC) addresses in the wireless network apparatus 1 to be used for simulating two wireless network cards 15, 16, and provides two wireless network transceiving modules 10, 11 to communicate with two wireless network base stations simultaneously, where the two wireless network base stations with the strongest signal strengths are selected so as to promote the wireless network communication speed of the electronic device. In addition, the communication loadings of the wireless network base stations connected to the wireless network cards 15, 16 are continuously being monitored so as to arrange for re-selection of a more suitable wireless network base station when necessary, thereby solving the problem of the user having to manually switch to a different wireless network base station when connectivity is not satisfactory.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A method for increasing wireless networking speed for use between an electronic device equipped with a wireless network apparatus and a wireless network having a group of wireless network base stations, said method comprising:
   (A) providing the wireless network apparatus with two medium access control (MAC) addresses so as to simulate two wireless network cards;
   (B) selecting, from among the group of wireless network base stations, two wireless network base stations respectively for the wireless network cards; and
   (C) making the electronic device simultaneously communicate with the selected wireless network base stations using the wireless network cards;
   wherein step (B) further comprises:
      (B1) searching the wireless network for the group of wireless network base stations;
      (B2) selecting, from among the group of wireless network base stations searched in sub-step (B1), one wireless network base station which is not recorded in a history list, which has a strongest signal strength, and which is not connected to one of said wireless network cards, the history list being used for recording those wireless network base stations that have been unsuccessful in establishing connection with one of the wireless network cards in the past;
      (B3) attempting to establish connection between the wireless network base station selected in sub-step (B2) and one of the wireless network cards which is not connected with any wireless network base station of the group;
      (B4) recording the wireless network base station selected in sub-step (B2) in the history list and returning to sub-step (B2) if it is determined that the attempt to establish the connection has failed in sub-step (B3);
      (B5) returning to sub-step (B2) if it is determined that the attempt to establish the connection is successful in sub-step (B3) and that one of the wireless network cards has not established connection with one wireless network base station within the group; and (B6) proceeding to step (C) if it is determined that the attempt to establish the connection is successful in sub-step (B3) and that each of the wireless network cards is connected to one wireless network base station within the group, wherein in sub-step (B2), if all of the wireless network base stations in the group of wireless network base stations are recorded in the history list, one wireless network base station which has been recorded in the history list the longest is selected.

2. The method as claimed in claim 1, wherein step (C) further comprises:

(C1) assigning a communication loading of 50% to each of the wireless network base stations selected in step (B);

(C2) making the electronic device communicate with each of the wireless network base stations selected in step (B) using a corresponding one of the wireless network cards with the communication loading assigned to the wireless network base station;

(C3) recording an actual communication loading and a response time for each of the wireless network base stations;

(C4) if it is determined with reference to the actual communication loadings and the response times recorded in sub-step (C3) for the wireless network base stations that it is necessary to adjust the assigned communication loadings for the two wireless network base stations and that the actual communication loading recorded in sub-step (C3) for each of the two wireless network base stations is not smaller than a predetermined loading threshold, adjusting the assigned communication loading for each of the two wireless network base stations according to an assignment rule, and returning to sub-step (C2);

(C5) if it is determined with reference to the actual communication loadings and the response times recorded in sub-step (C3) for the wireless network base stations that it is unnecessary to adjust the assigned communication loadings for the two wireless network base stations, returning to sub-step (C3);

(C6) if it is determined that the actual communication loading recorded in sub-step (C3) for one of the wireless network base stations is smaller than the predetermined loading threshold, determining whether a signal strength of said one of the wireless network base stations is greater than a predetermined signal strength threshold;

(C7) if it is determined that the signal strength is greater than the predetermined signal strength threshold in sub-step (C6), recording said one of the wireless network base stations in a priority list and the history list;

(C8) if it is determined that the signal strength is not greater than the predetermined signal strength threshold in sub-step (C6), recording said one of the wireless network base stations in the history list; and (C9) making the electronic device stop communicating with said one of the wireless network base stations using the corresponding one of the wireless network cards and returning to step (B) to select, from among the group of wireless network base stations, another wireless network base station in place of said one of the wireless network base stations for the corresponding one of the wireless network cards.

3. The method as claimed in claim 2, wherein in step (B), if all of the wireless network base stations in the group are recorded in one of the priority list and the history list, one wireless network base station which has been recorded in the priority list the longest is selected, and if no wireless network base stations is recorded in the priority list, one wireless network base station which has been recorded in the history list the longest is selected.

4. A computer program product, comprising a non-transitory computer readable storage medium that includes program instructions, which when executed by an electronic device, cause the electronic device to perform the method according to claim 1.

5. A wireless network apparatus to be provided on an electronic device for enabling the electronic device to communicate wirelessly and simultaneously with two wireless network base stations, said wireless network apparatus comprising:

two wireless network transceiving modules capable of communicating with a corresponding wireless network base station;

a memory recorded with two medium access control (MAC) addresses;

a driver for simulating two wireless network cards respectively based on the MAC addresses; and a processor coupled electrically to said memory and said wireless network transceiving modules, capable of converting wireless network signals that are received from said wireless network transceiving modules via said wireless network cards into digital signals acceptable by the electronic device, and further capable of converting digital signals that originate from the electronic device into wireless network signals for subsequent transmission to said wireless network transceiving modules via said wireless network cards, wherein said processor is loaded with a first application program, which when executed, causes said processor to search a wireless network for a group of wireless network base stations, and to select, from among the group of wireless network base stations, two wireless network base stations respectively for said wireless network cards, and a second application program, which when executed, causes said processor to simultaneously communicate with the selected wireless network base stations using said wireless network cards;

wherein said first application program causes said processor to select, from among the group of wireless network base stations searched thereby, for each of said wireless network cards, a wireless network base station which is not recorded in a history list and which has a strongest signal strength, to attempt to establish connection between said wireless network card and the wireless network base station thus selected, and to determine whether the attempt to establish the connection is successful, the history list being used for recording those wireless network base stations that have been unsuccessful in establishing connection with one of said wireless network cards in the past;

wherein said second application program is executed by said processor if it is determined that the attempt is successful for both of said wireless network cards; and wherein if it is determined that the attempt has failed, said first application program causes said processor to record the wireless network base station thus selected in the history list, and to re-select, from among the group of wireless network base stations searched thereby, a wireless network base station with the strongest signal strength and not recorded in the history list for the corresponding one of said wireless network cards, wherein if all of the wireless network base stations in the group of wireless network base stations are recorded in the history list, two wireless network base stations which have been recorded in the history list the longest are selected for said wireless network cards.

6. The wireless network apparatus as claimed in claim 5, wherein said processor is caused by said second application program to assign a communication loading of 50% to each of the wireless network base stations selected thereby, to make the electronic device communicate with each of the wireless network base stations using a corresponding one of said wireless network cards with the communication loading assigned to the wireless network base station, to record an actual communication loading and a response time for each of the wireless network base stations, to adjust the assigned communication loading for each of the wireless network base stations if it is determined with reference to the actual communication loadings and the response times thus recorded for the wireless network base stations that adjustment of the assigned communication loading is necessary and that the actual communication loading for each of the wireless network base stations is not smaller than a predetermined loading threshold, to determine, upon determining that the actual communication loading for one of the wireless network base stations is smaller than the predetermined loading threshold, whether a signal strength of said one of the wireless network base stations is greater than a predetermined signal strength threshold, to record said one of the wireless network base stations in a priority list and the history list if it is determined that the signal strength is greater than the predetermined signal strength threshold, to record said one of the wireless network base stations in the history list if it is determined that the signal strength is not greater than the predetermined signal strength threshold, and to make the electronic device stop communicating with said one of the wireless network base stations using the corresponding one of said wireless network cards and re-execute said first application program so as for said processor to select, from among the group of wireless network base stations, another wireless network base station in place of said one of the wireless network base stations for the corresponding one of said wireless network cards.

7. The wireless network apparatus as claimed in claim 6, wherein if all of the wireless network base stations in the group are recorded in one of the priority list and the history list, one wireless network base station which has been recorded in the priority list the longest is selected by said processor, and if no wireless network base stations is recorded in the priority list, one wireless network base station which has been recorded in the history list the longest is selected by said processor.

8. The wireless network apparatus as claimed in claim 5, wherein said driver is to be installed in the electronic device for execution thereby.

* * * * *